March 19, 1963  W. J. O'BRIEN  3,081,839
RESCUE APPARATUS
Filed Dec. 5, 1960  6 Sheets-Sheet 1
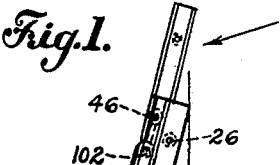
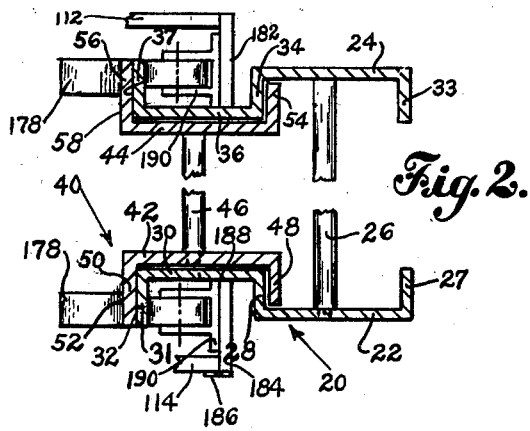
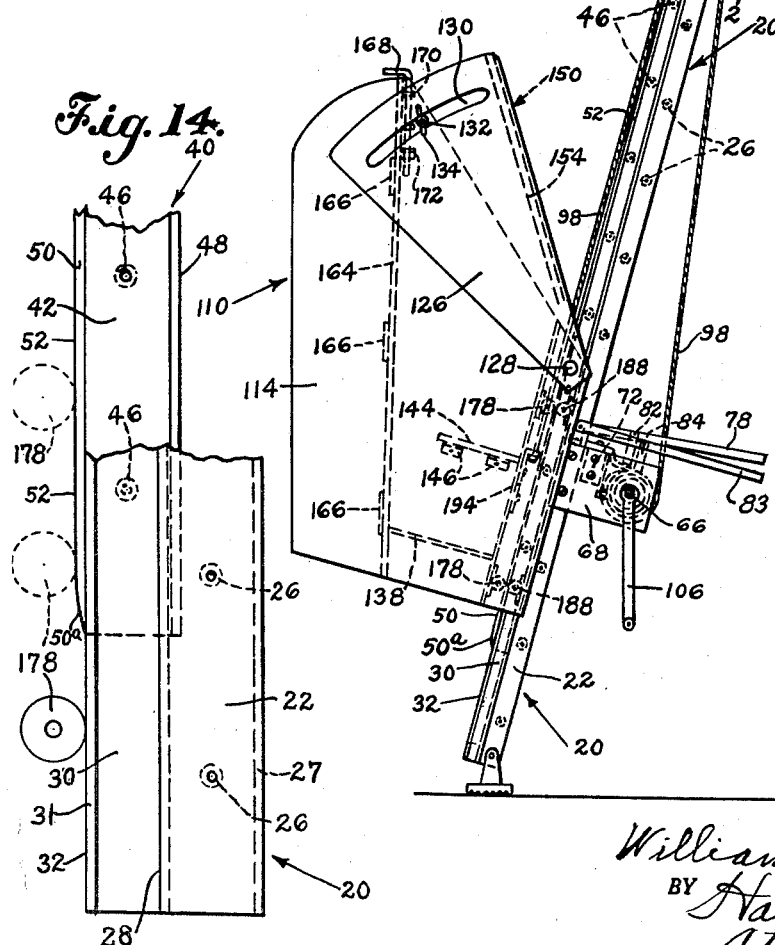
INVENTOR.
William J. O'Brien
BY Harold E. Cole
Attorney

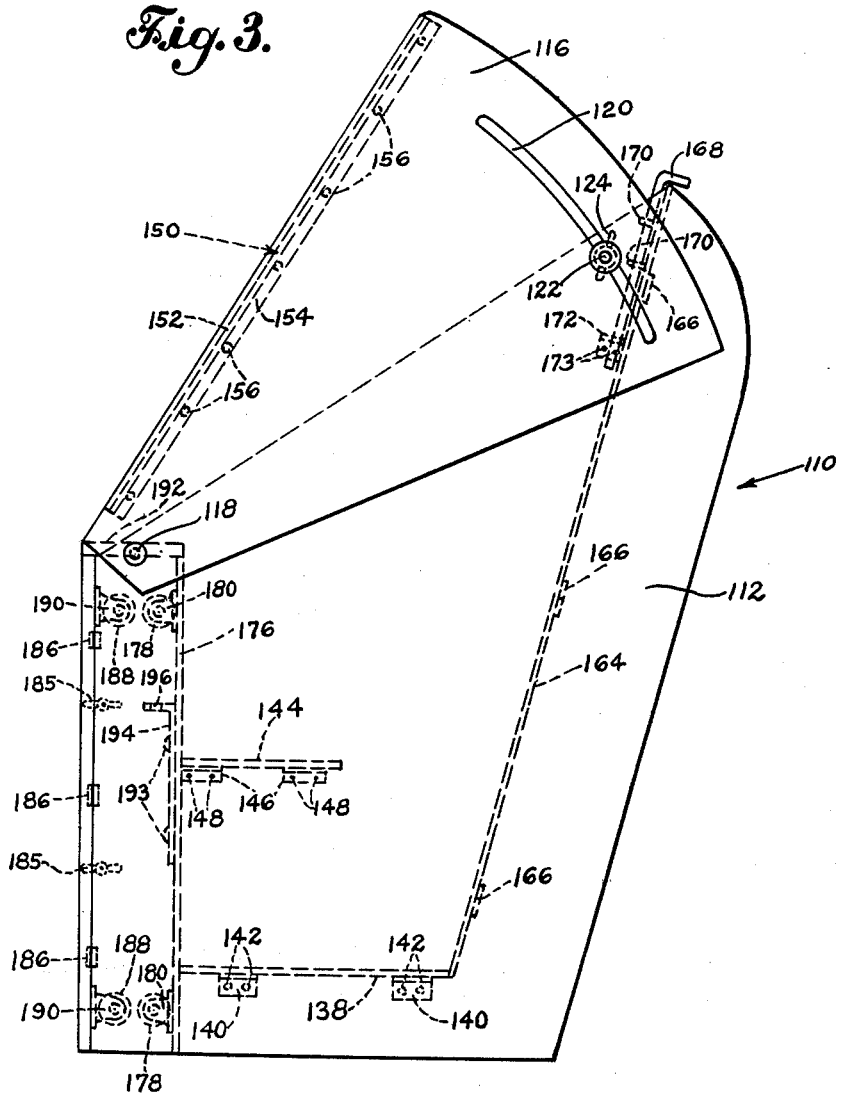

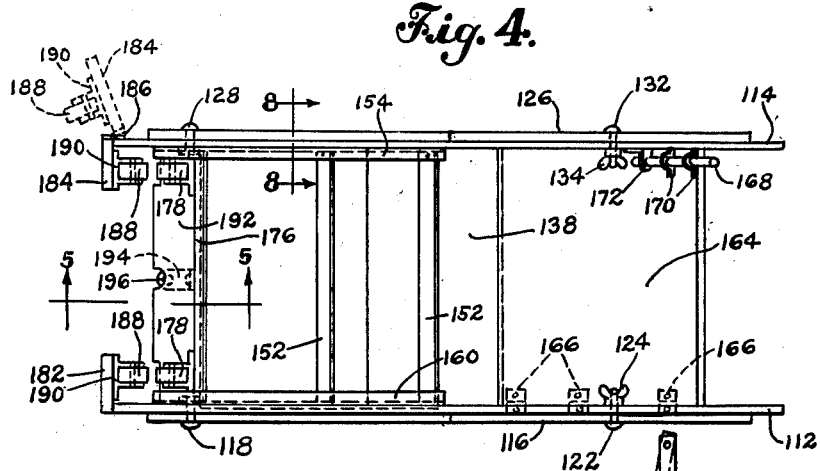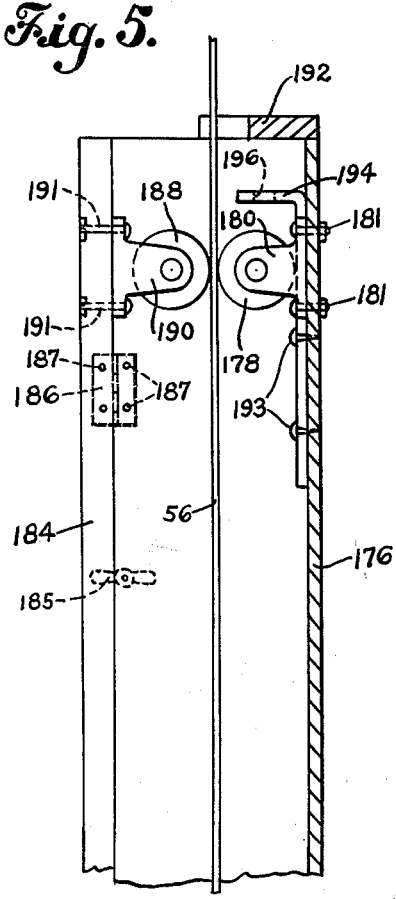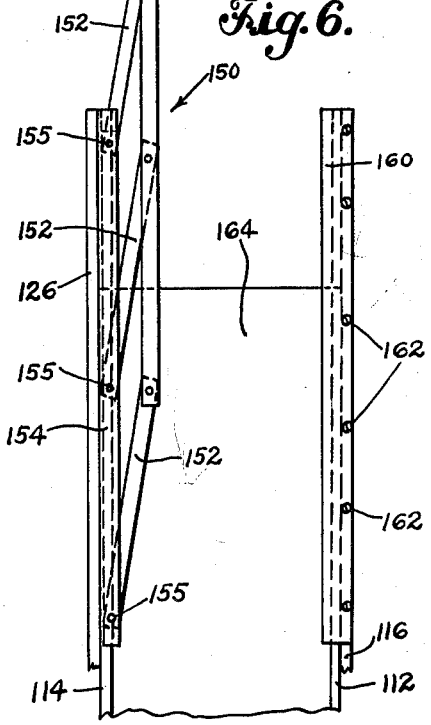

March 19, 1963 W. J. O'BRIEN 3,081,839
RESCUE APPARATUS
Filed Dec. 5, 1960 6 Sheets-Sheet 4
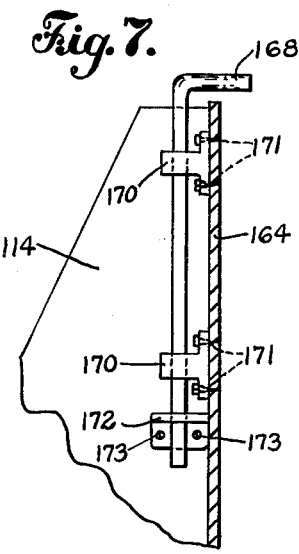
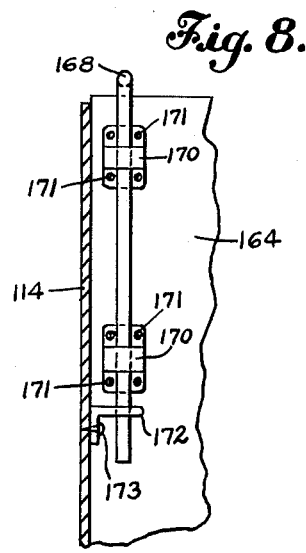
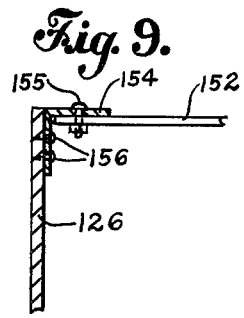
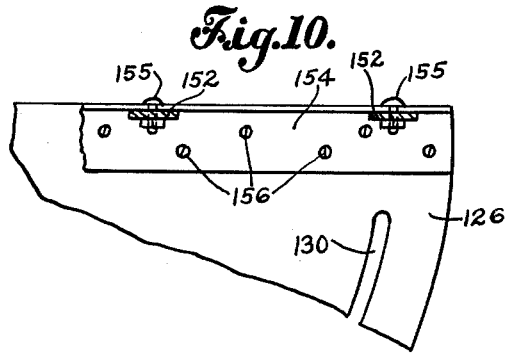
INVENTOR.
William J. O'Brien
BY Harold E. Cole
Attorney

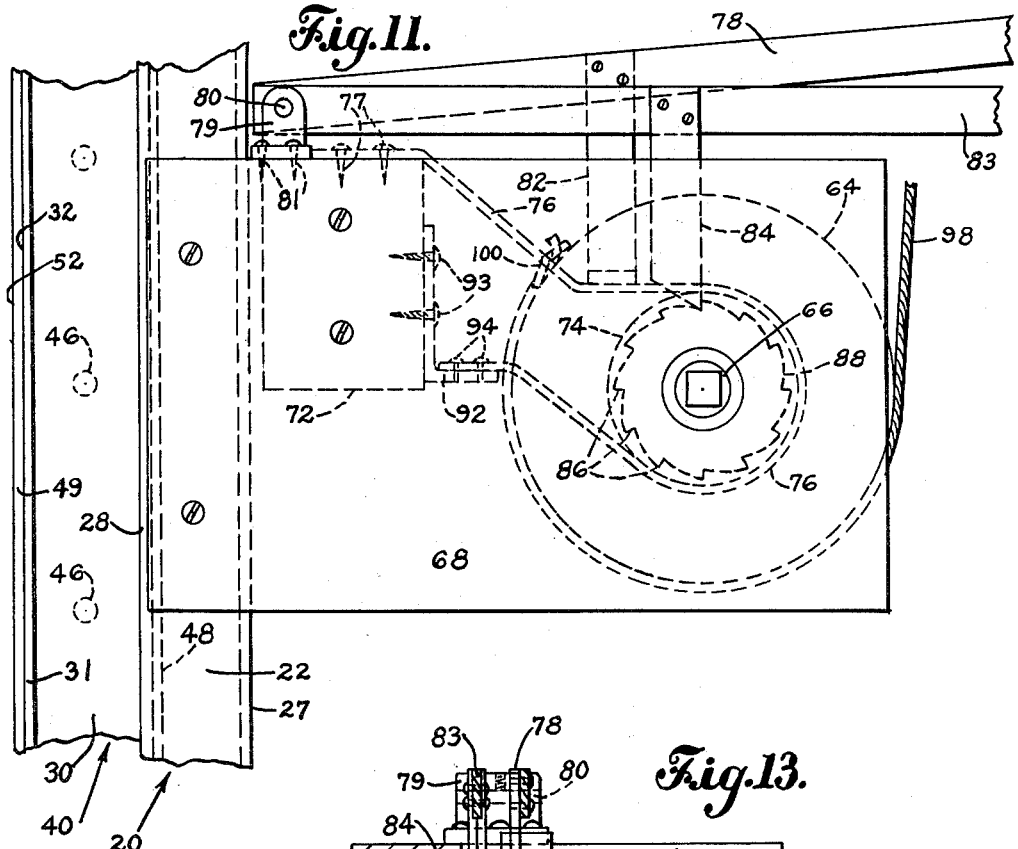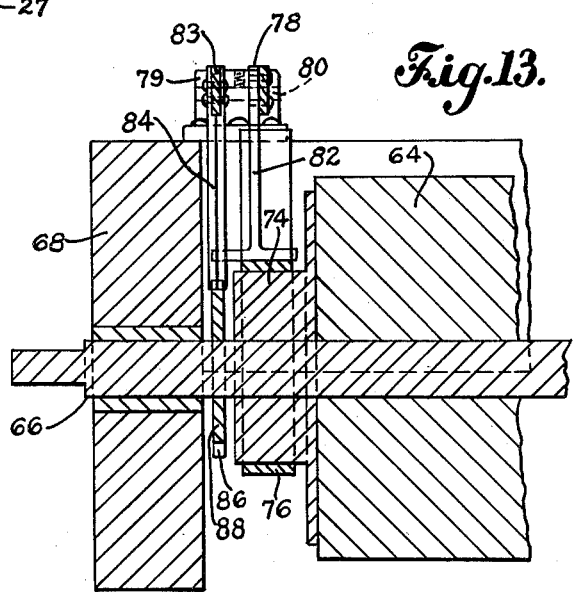

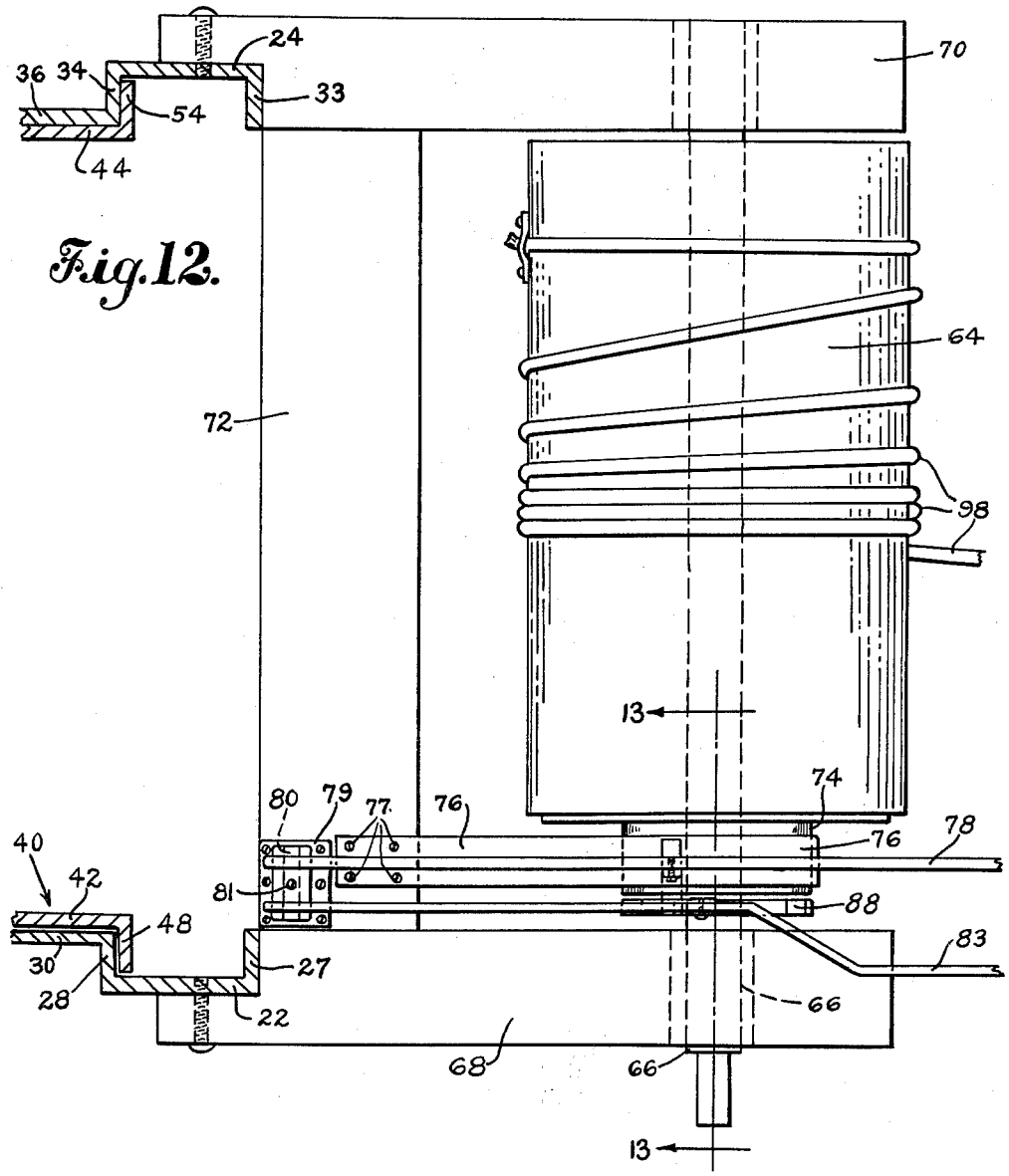

United States Patent Office

3,081,839
Patented Mar. 19, 1963

3,081,839
RESCUE APPARATUS
William J. O'Brien, 12 Wren St., Boston, Mass.
Filed Dec. 5, 1960, Ser. No. 73,592
5 Claims. (Cl. 182—103)

This invention relates to rescue apparatus suitable for rescuing persons or animals from an upper story of a burning building, for instance, or from an underground mine or cave.

One object of my invention is to provide a supporting member, which may also serve as a ladder, and on which can run a carrier or conveyor in which the rescued persons are transported.

Another object is to provide a plurality of supporting members so arranged that one is movably connected to the other, each providing track surfaces communicating with each other so that a carrier may run continuously over one supporting member and then the other, whether upwardly or downwardly.

A further object is to provide a carrier for my supporting apparatus so constructed that it provides movable guide members at the sides to aid in guiding persons aboard the carrier, and which guide members may be adjusted so they may contact and rest on the side of a building thus obtaining additional support for the carrier.

A still further object is to provide rescue apparatus that is relatively simple to manufacture and to operate, so that it is economical to produce and no special training is required to make use of it.

The foregoing and other objects which will appear as the nature of the invention is better understood, may be accomplished by a construction, combination and arrangement of parts such as is disclosed by the drawings. The nature of the invention is such as to render it susceptible to various changes and modifications, and therefore, I am not to be limited to the construction disclosed by the drawings, nor to the particular parts described in the specification; but am entitled to all such changes therefrom as fall within the scope of my claims.

In the drawings:

FIG. 1 is a side elevational view of my rescue apparatus showing two supporting members associated together and a carrier running on the track surfaces of the second supporting member.

FIG. 2 is an enlarged, sectional view taken on the line 2—2 of FIG. 1.

FIG. 3 is a side elevational view of my carrier.

FIG. 4 is a top plan view of my carrier, the dash lines indicating a retainer member swung to open position.

FIG. 5 is an enlarged, sectional view taken on the line 5—5 of FIG. 4.

FIG. 6 is a fragmentary, elevational view of my carrier showing the entrance gate for the carrier in open position.

FIG. 7 is a fragmentary, side elevational view, partly in section, showing a hand bolt that locks the carrier exit gate.

FIG. 8 is similar to FIG. 7; but at a right angle thereto.

FIG. 9 is a fragmentary, plan view, showing how an entrance gate cross bar is attached to a carrier side guide.

FIG. 10 is a fragmentary, side elevational view showing how an entrance gate cross bar is attached to a carrier side guide.

FIG. 11 is a fragmentary, side elevational view of my apparatus supporting members showing the mechanism for raising and lowering said carrier.

FIG. 12 is a top plan view showing the mechanism for raising and lowering said carrier, the supporting members being shown in section.

FIG. 13 is a sectional view taken on the line 13—13 of FIG. 12.

FIG. 14 is a fragmentary, side elevational view showing the lower and second supporting members associated together in position of use, and showing a carrier roller in full and in dash lines, on track surfaces of both said members.

As illustrated, my apparatus has a lower supporting member 20 which has two supporting sides 22 and 24 spaced apart similar to those of a well-known ladder, between which rungs 26 extend and are attached. Said side 22 has a strengthening flange 27 and an angular retainer 28 spaced from the latter and extending inwardly. Extending from said retainer 28 is a track portion 30 terminating in an outwardly extending flange 31 that provides a front face or track surface 32.

Said side 24 has a strengthening flange 33 and an angular retainer 34 spaced from the latter and extending inwardly. Extending from said retainer 34 is a track portion 36 terminating in an outwardly extending flange 37 that provides a front face or track surface 38. Rollers 178, later described, run over said track surfaces 32 and 38 until they reach the next or second supporting member.

Since more than one supporting member will ordinarily be needed, I show a second supporting member 40 that is slidably retained by said retainers 28 and 34 and said flanges 31 and 37. This member 40 has two supporting sides 42 and 44 spaced apart and between which rungs 46 extend. Said side 42 has a flange 48 adjacent said retainer 28 and a track portion provided by an outwardly extending flange 50 in front that provides a front face or track surface 52 at the front of said second supporting member and outside said track surface 32 where they overlap.

Said side 44 has a flange 54 adjacent said retainer 34, and a track portion provided by an outwardly extending flange 56 that provides a face or track surface 58 at the front of said supporting member and outside said track surface 38 where they overlap. When said second supporting member 40 is reached, said rollers 178 run on said track surfaces 52 and 58, as later explained. Said flanges 50 and 56 taper at their lower ends as at 50a and 56a respectively and they lie on the upper end portions of said track portions 30 and 36 so that the rollers will pass fairly smoothly from one said supporting member 20 to the next supporting member 40, since their track surfaces are, in practical effect, continuous one with the other.

I provide carrier actuating means having a circular cable drum 64 fixedly attached on a rotatable shaft 66 that is mounted in oppositely disposed side supports 68 and 70 attached to said lower supporting member sides 22 and 24. A cross support 72 extends between and is attached to said side supports 68 and 70.

At said side 24 I provide braking instrumentalities for said carrier actuating means having a brake drum 74 with brake lining 76 thereon that is attached, at one end, to said cross support 72 as at 77. A brake lever 78 is pivotally mounted on a pin 80 that is mounted in a pivot support 79 which is fastened to said cross support 72 by screws 81. Said lever 78 has a finger 82 extending downwardly, and during the braking action contacts said brake lining 76.

Another lever 83 is pivotally mounted on said pivot support 79 and it carries a dog 84 that enters between teeth 86 of a well-known ratchet wheel 88 to prevent backward rotation of said cable drum 64. Movement of said brake lever 78 upwardly carries said finger 82 away from said brake lining 76. Movement upwardly of said lever 83 moves said dog 84 to thereby lift it from between said teeth 86 thus permitting a release movement of said cable drum 64, as when the carrier descends.

An angle iron 92 is attached to said cross support 72 by means of screws 93 extending through one angular portion thereof. One end of said brake lining 76 is attached to another angular portion thereof by screws 94. Pressure on said brake lining 76 prevents rotation of said cable drum 64 in either direction.

A cable 98 is attached, as at 100, to said cable drum 64 and is wound tightly around the latter as the carrier ascends. Said cable 98 extends over a pulley 102 that is attached, as shown, to a said rung 46 of said supporting member 40. A crank handle 106, attached to said drum shaft 66, winds said cable around said drum 64 when rotated to thereby move said carrier upwardly.

The rescue carrier or conveyor 110 has a main side 112 and an opposite main side 114. An adjustable side member or guide 116 is pivotally attached to said main side 112 by a bolt 118. This side member 116 has an arcuate slot 120 therein and is movably connected by a bolt 122 that extends from said side member 112 through said slot 120 being held by a wing nut 124. Another adjustable side member or guide 126 is movably attached to said side 114 by a bolt 128. This adjustable side 126 has an arcuate slot 130 therein, similar to slot 120, and is movably connected by a bolt 132 to said side 114, which latter bolt is held by a wing nut 134. Said slots 120 and 130 permit the side members 116 and 126 to be moved to the desired position, so that they will fill in the space between said main sides 112 and 114 and the side of a building or the like, or partly fill it in, when said carrier 110 reaches the point where rescue from the building is to be effected. Thus these adjustable side members provide guides to aid in the entry of rescued persons from a building or the like into my carrier.

Said carrier 110 has a bottom or passenger platform 138 attached to angle members 140 fastened by screws 142 to said sides 112 and 114. It also has another and higher passenger platform 144 connected to said main sides 112 and 114 by angle members 146 attached by screws 148 to said latter sides. These platforms enable the rescue of two persons in said carrier 110, keeping them fom jostling each other as the carrier descends. Said carrier has an entrance gate 150 having three cross bars 152 attached to an angle member 154 by bolts 155. Said angle member 154 is attached to said side 126 by screws 156.

A vertical strip 160 is fastened to the edge of said side 116 by screws 162 and it serves as a retainer for gate 150. An exit gate or door 164 extends between the two main sides 112 and 114, being fastened to said side 112 by hinges 166. A sliding, hand bolt 168 is mounted in two sockets 170 which are fastened to said door 164 by screws 171. This bolt 168 also extends through another socket 172 which is fastened to the side 114 by screws 173, thus forming a secure lock for the door 164. By pulling said bolt 168 upwardly, it passes through said socket 172 thus releasing the door 164 to permit a person to enter or leave.

The forward part of the carrier 110 has a roller supporting member 176 attached to said sides 112 and 114, and on each side of which are mounted two rollers 178 rotatably set in bracket supports 180 which, in turn, are fastened to supporting member 176 by bolts 181.

On the front edges of said sides 112 and 114, I show two retainer members 182 and 184 which can serve as roller supports, one of which (184) is connected to said side by hinges 186 held by screws 187. These hinges 186 permit said retainer 184 to swing out, thus facilitating the mounting of said carrier 110 on a said supporting member and likewise removing it therefrom. Turnbuttons 185 movably mounted on said side 114 hold said retainer member 184 in closed position while my carrier is in position of use on a said supporting member. There are two rollers 188 shown for each said retainer member 182 and 184, the use of which rollers is optional. They are rotatably mounted in bracket supports 190 that in turn are fastened to said retainer members 182 and 184 by bolts 191. A cross bar 192 extends between said sides 112 and 114, serving as a brace. Fastened to the roller supporting member 176 by screws 193 is an angle member 194 to which said cable 98 is fastened by entering a hole 196 and knotted over. Said carrier 110 is raised and lowered by means of this cable 98 as later explained.

In operation, said carrier 110 is placed on said lower supporting member 20 with said rollers 178 on said track surfaces 32 and 38. The second supporting member is moved to any desired position above said lower supporting member 20, depending upon the height of the window or other place on a building where rescued persons are to leave. The cable 98 is attached to a pulley on said second member 40 and then extends downwardly and is connected to said carrier. The carrier is drawn upwardly with the rollers 178 running upon said lower supporting member track surfaces 32 and 38, and then onto said second supporting member track surfaces 52 and 58 until the desired height is reached so a person can pass into the entrance provided by opening said gate 150. Said rollers 188, if used, are rearwardly of said flanges 31 and 37, as are said retainer members 182 and 184. When they reach the second supporting member 40 said rollers 188 are rearwardly of said flanges 50 and 56.

As illustrated, said carrier 110 may be drawn upwardly by rotating said drum shaft 66, as by a crank, as shown, in a direction that winds said cable 98 around said drum 64, which draws the carrier upwardly. When the person or persons to be rescued, are aboard the carrier, said shaft 66 is allowed to rotate, or is rotated, to unwind said cable 98 around said drum. When the carrier arrives at the bottom of the lower supporting member, the exit gate 164 is opened and said person or persons step out of the carrier.

By releasing the turnbuttons 185 said retainer member 184 is opened, as shown in dash lines in said FIG. 4, and the carrier may be moved off the lower supporting member 20. This then leaves the supporting members free to be used as ladders or for other purposes.

To rescue a person or persons who are below the ground, the operation would be reversed, lowering the carrier 110 to the rescue position, after positioning the lower supporting member 20, or adjusting both the lower and second supporting members 20 and 40 respectively if both are used, to the correct positions to effect the rescue.

What I claim is:

1. Rescue apparatus comprising a ladder and a carrier movably mounted thereon at the front thereof, said carrier comprising two main sides, a bottom attached to and extending between said sides, said carrier having an entrance opening, two adjustable side members adapted to provide sides for said entrance opening, first means adjacent the top of said main sides and adjacent the bottom of said adjustable side members pivotally connecting each said adjustable side member to each of said main sides, said adjustable side members each having a slot therethrough extending laterally thereof, and adjustable second means adjacent, and connected to, a portion of each said main side and extending through each of said slots whereby said adjustable side members may be moved forwardly and rearwardly with relation to said main sides, said slots being of such length and said second means being so positioned that said adjustable side members may be moved beyond said main sides to thereby provide side guides for said carrier at said entrance opening.

2. Rescue apparatus comprising a ladder embodying supporting means, and a carrier at the front thereof embodying rollers movably mounted on said supporting means, said carrier comprising two main sides, a bottom attached to and extending between said sides, said carrier having an entrance opening, two adjustable side members adapted to provide sides for said entrance opening, first means adjacent the top of said main sides and adjacent the bottom of said adjustable side members pivotally connecting each said adjustable side member to each of said main sides at points upwardly beyond said rollers in position of use, said adjustable side members each having a slot therethrough extending laterally thereof, and adjustable second means adjacent, and connected to, a portion of each said main side and extending through each of said slots whereby said adjustable side members may be moved forwardly and rearwardly with relation to said main sides, said slots being of such length and said second means being so positioned that said adjustable side members may be moved beyond said main sides to thereby provide side guides for said carrier at said entrance opening.

3. Rescue apparatus comprising a ladder and a carrier movably mounted thereon at the front thereof, said carrier comprising two main sides, a bottom attached to and extending between said sides, said carrier having an entrance opening, two adjustable side members outside of said main sides adapted to provide sides for said entrance opening and spreading outwardly and upwardly in width, first means adjacent the top of said main sides and located adjacent relatively narrow portions of said adjustable side members, pivotally connecting each said adjustable side member to each of said main sides, said adjustable side members each having a slot therethrough at relatively wide portions extending laterally thereof, and adjustable second means adjacent, and connected to, a portion of each said main side and extending through each of said slots whereby said adjustable side members may be moved forwardly and rearwardly with relation to said main sides, said slots being of such length and said second means being so positioned that said adjustable side members may be moved beyond said main sides to thereby provide side guides for said carrier at said entrance opening.

4. A carrier for rescue apparatus comprising two main sides extending diagonally upward and outward, a bottom attached to, and extending between, said sides, two adjustable side members, first means pivotally connecting each said adjustable side member to each of said main sides adjacent the upper front extremity of the latter, said adjustable side members each having a slot therethrough extending laterally thereof, and adjustable second means adjacent, and connected to, a portion of each said main side and extending through each of said slots whereby said adjustable side members may be moved forwardly and rearwardly with relation to said main sides, said slots being of such length and said second means being so positioned that said adjustable side members may be moved beyond said main sides to thereby provide side guides for said carrier.

5. A carrier for rescue apparatus comprising two main sides extending diagonally upward and outward, a bottom attached to, and extending between, said sides, two adjustable side members, first means pivotally connecting each said adjustable side member to each of said main sides adjacent the upper front extremity of the latter, said adjustable side members each having an arcuate slot therethrough extending laterally in the upper half portion thereof, and adjustable, second means adjacent, and connected to, a portion of each said main side and extending through each of said slots whereby said adjustable side members may be moved forwardly and rearwardly with relation to said main sides, said slots being of such length and said second means being so positioned that said adjustable side members may be moved beyond said main sides to thereby provide side guides for said carrier.

References Cited in the file of this patent

UNITED STATES PATENTS

| | | |
|---|---|---|
| 1,505 | Penfield | Mar. 3, 1840 |
| 1,924,751 | Porter | Aug. 29, 1933 |
| 2,198,071 | Artini | Apr. 23, 1940 |
| 2,249,900 | Honig | July 22, 1941 |
| 2,312,833 | Graham | Mar. 2, 1943 |
| 2,438,791 | Russell | Mar. 30, 1948 |
| 2,588,959 | Campbell | Mar. 11, 1952 |

FOREIGN PATENTS

| | | |
|---|---|---|
| 352,480 | Great Britain | July 7, 1931 |